United States Patent [19]

Kimura et al.

[11] Patent Number: 5,143,980
[45] Date of Patent: Sep. 1, 1992

[54] METHOD OF PRODUCING CHLORINATED RUBBER

[75] Inventors: Itsuo Kimura; Kentaro Nobori; Shigeki Hikasa, all of Iwakuni, Japan

[73] Assignee: Sanyo-Kokusaku Pulp Co., Ltd., Tokyo, Japan

[21] Appl. No.: 680,924

[22] Filed: Apr. 5, 1991

[30] Foreign Application Priority Data

Jun. 29, 1990 [JP] Japan .................... 2-172145

[51] Int. Cl.$^5$ .............................. C08F 8/22
[52] U.S. Cl. .................... 525/358; 525/332.3; 525/332.8; 525/332.9; 525/333.1; 525/333.2
[58] Field of Search ......................... 525/358

[56] References Cited

U.S. PATENT DOCUMENTS

| | | | |
|---|---|---|---|
| 3,725,359 | 4/1973 | Goswami et al. | 525/358 |
| 3,896,095 | 7/1975 | Morrissey | 525/358 |
| 3,933,753 | 1/1976 | Kuntz et al. | 525/358 |
| 3,936,430 | 2/1976 | Schoen et al. | 525/358 |
| 4,412,898 | 11/1983 | Olson et al. | 525/358 |
| 4,536,266 | 8/1985 | Blietept et al. | 525/358 |
| 4,547,554 | 10/1985 | Kadomatsu et al. | 525/358 |
| 4,562,224 | 12/1985 | Busch et al. | 525/358 |
| 5,087,673 | 2/1992 | Watanabe et al. | 525/358 |

*Primary Examiner*—Bernard Lipman
*Attorney, Agent, or Firm*—Oblon, Spivak, McClelland, Maier & Neustadt

[57] ABSTRACT

A method of producing organic solvent-soluble chlorinated rubber is disclosed, which is characterized in that, in the method of chlorinating rubber latex with chlorine gas up to 60 to 75% chlorine content in the aqueous medium as it is, (A) nonionic or cationic surfactant is added to rubber latex prior to chlorination and then acid is added to perform the acidifying treatment of latex, (B) rubber latex is chlorinated up to at least not less than 30% chlorine content at a temperature of not higher than 50° C. blocking off the light in the first step of chlorination, and (C) remaining chlorination is performed while irradiating ultraviolet rays in the second step of chlorination. The chlorinated product is also claimed.

8 Claims, No Drawings

METHOD OF PRODUCING CHLORINATED RUBBER

BACKGROUND OF THE INVENTION

The present invention relates to a novel production method of chlorinated rubber widely used for mainly heavy anticorrosion paint for outdoor buildings etc. and a novel chlorinated rubber thus obtainable.

The chlorinated rubber is a resin chlorinated natural rubber, synthetic rubber or the like up to 60% or more chlorine content. Since it dissolves into organic solvents and is excellent in the weather resistance, it is used for the heavy anticorrosion paint etc. and produced in abundance industrially. Today, for producing chlorinated rubber industrially, a method (solution method) is adopted, wherein natural rubber or synthetic rubber is dissolved into chlorine-containing solvent being inert to chlorine such as carbon tetrachloride and the chlorination is performed by introducing chlorine gas to this solution.

When performing the chlorination by solution method, not only expensive chlorine-containing organic solvent must be used in large quantities, which is uneconomic, but also complete separation and recovery of chlorine-containing solvent such as carbon tetrachloride from product are difficult, thus it admixed within product or it volatilized to escape into the atmosphere. It is pointed out that the chlorine-containing organic solvent represented by carbon tetrachloride is injurious to the human body and it has a danger to destroy the ozone layer as well, so it is very probable that it cannot be used hereafter. The chlorination by solution method adopted traditionally has therefore serious problems as described above.

Moreover, as a quite different chlorinating method from the solution method, an attempt to chlorinate the latex of natural rubber has been made. In Brit. Pat. 634241 or Industrial and Engineering Chemistry, Vol. 43, P. 2535 (1951), a method wherein cationic latex is prepared from natural rubber and chlorination is conducted by blowing chlorine gas thereinto is described. By this method, however, only a product with 61% chlorine content at maximum could be obtained and the chlorinated rubber obtained could not dissolve into solvent, thus it could not be used for paint. For obtaining chlorinated rubber soluble into solvent from this product, it was required to suspend the product with about 61% chlorine content into solvent such as carbon tetrachloride for further chlorination. Furthermore, in Japanese Patent Publication No. Sho 34-10195, a chlorinated rubber-making method wherein, after hydrochlorinated rubber is produced from natural rubber or synthetic rubber latex and then this is chlorinated up to 50 to 60%, the product is separated and chlorination is performed in the state of solid phase to dissolve into solvent is disclosed. But, the procedure is complicated and, in addition, the reaction efficiency is poor resulting in the lack of economic aspect. As described, there are many problems in the attempts to produce chlorinated rubber from latex, so that they have not been put into practice industrially.

As a result of diligent studies for solving said problems, the inventors have found that the chlorine-containing organic solvent such as carbon tetrachloride is not used at all, nevertheless the chlorinated rubber soluble into organic solvent can be produced directly from latex through following process.

SUMMARY OF THE INVENTION

In the method of chlorinating rubber latex with chlorine gas up to 60 to 75% chlorine content in the aqueous medium as it is, (A) nonionic or cationic surfactant is added to rubber latex prior to chlorination and then acid is added to perform the acidifying treatment of latex, (B) rubber latex is chlorinated up to at least not less than 30% chlorine content at a temperature of not higher than 50° C. blocking off the light in the first step of chlorination, and (C) remaining chlorination is performed while irradiating ultraviolet rays in the second step of chlorination.

The novel chlorinated rubber obtainable by the inventive method has an excellent painting performance, in particular, it is excelent in the saline water spray resistance, humidity resistance and alkali resistance.

DETAILED DESCRIPTION OF THE INVENTION

The rubber latices in the inventive method are referred to as polydiene type rubber latices such as natural rubber latex, synthetic polyisoprene rubber latex, polybutadiene latex, SBR latex and polychloroprene rubber latex. Moreover, they may be the depolymerization products of these latices or the modified latices provided with the modification such as grafting. Among these, natural rubber latex or synthetic polyisoprene rubber latex is advantageous for practicing industrially because of low cost and many uses of chlorinated rubber obtained.

If blowing chlorine gas directly into rubber latex with no treatment, the latex will coagulate, thus chlorination is impossible. This is because of that the latex is anionic and, on blowing chlorine gas, hydrochloric acid is formed to destroy the latex. For this reason, a treatment adding nonionic surfactant or cationic surfactant to rubber latex prior to chlorination and then adding acid to acidify the latex is performed. When performing this treatment, the latex does not coagulate permitting the chlorination even if chlorine gas may be blown into rubber latex. The level of nonionic or cationic surfactant is preferable to be 0.5 to 10% based on the solids of latex. If under 0.5%, the coagulation of latex cannot be prevented and also, if over 10%, the effect may not improve. Further preferable level is 2 to 5%. As the nonionic surfactants, polyoxyethylene alkyl ether, polyoxyethylene alkylphenyl ether, polyoxyethylene alkyl ester, sorbitan alkyl ester, polyoxyethylene sorbitan alkyl ester, etc. and, as the cationic surfactants, aliphatic amine salts or their quaternary ammonium salts, aromatic quaternary ammonium salts, heterocyclic quaternary ammonium salts, etc. can be mentioned. As the acids to be added, formic acid, acetic acid, hydrochloric acid, sulfuric acid, etc. can be used, but hydrochloric acid is preferable. The level of acid to be added is preferable to be such one that pH of latex becomes not higher than 3 and the level to bring pH to not higher than 1 is more preferable. If the level of acid is lower, the coagulation of latex cannot be prevented and, if it is too high, the side reaction is caused, which is unpreferable. The concentration of latex in chlorinating reaction is preferable to be 1 to 20%. If over 20%, the viscosity increases with the progress of chlorination to decrease the reaction efficiency and, if under 1%, the producibility is poor.

In the first step of chlorination, the chlorine gas is blown into latex at a temperature of not higher than 50° C. blocking off the light to chlorinate up to at least not less than 30% chlorine content. Since polydiene type rubber latex has double bonds in the molecule, as the chlorine gas is blown into latex, chlorine atoms add to double bonds. The addition reaction of chlorine to double bond progresses rapidly even at low temperature, thus the chlorination up to 30% or more chlorine content is performed in a short time retaining the state of latex. At this time, if irradiating the light or raising the temperature over 50° C., the coagulation of latex is caused, thus the chlorination cannot be proceeded. Since the chlorination proceeds exothermically, it is preferable to chlorinate under cooling. Whether or not the chlorine content reached 30% or more can be known from the level of chlorine gas introduced to latex. Moreover, in the first step of chlorination, if performing the chlorination while continuously or intermittently adding surfactant, not only the total addition quantity of surfactant can be decreased, but also the efficiency of chlorination can be enhanced, which is preferable. This seems to be due to that, while the surfactant is chlorinated with chlorine gas and its effect is lost, the loss is compensated to prevent the coagulation of latex particles, and, for this reason, such effect that chlorine is liable to penetrate into the inner portion of particles permitting homogenous chlorination is also exerted.

In the second step of chlorination, the chlorination is performed up to 60 to 75% chlorine content while irradiating ultraviolet rays. When reaching 30% or more chlorine content, the coagulation is no longer caused even if light may be irradiated or temperature may be raised. If under 60% chlorine content, the chlorinated rubber does not dissolve into solvent and, if over 75% chlorine content, the utilization efficiency of chlorine becomes poor. Here, ultraviolet rays generally indicate the light with a wavelength of not higher than 400 nm, but, in the invention, ultraviolet rays mean rays to give the light mainly in the ultraviolet region. And, as the light sources, mercury lamp, carbon arc lamp, rare gas discharge tube, etc. can be mentioned. While the fact that the light serves as a catalyst in the chlorinating reaction has been known widely so far, on the other hand the knowledge went no further than being simply at an extent that, if irradiating the light, the chlorination would progress faster, thus the chlorination was performed very frequently by irradiating the sunlight or the light of fluorescent lamp. These lights contain ultraviolet rays, but the proportion is low, so they are suitable to be said as visible rays and it cannot be said that ultraviolet rays are irradiated. Whereas, in consequence of extensive experiments, the inventors have found that, while it is difficult to make the chlorinated rubber soluble into solvent through the irradiation of sunlight or light of fluorescent lamp, if using a light source giving the light mainly in the ultraviolet region, the reaction efficiency in chlorination is high and the chlorinated rubber soluble also into solvent can be produced. The reason is not so well known, but it seems that components of near ultraviolet (300 nm or more) in ultraviolet rays would be required at a level of not less than certain intensity.

Moreover, in the second step of chlorination, the scissoring reaction of the molecules of chlorinated rubber occurs, thus decreasing the molecular weight, beside the progress of chlorination. It is presumed that the decrease in molecular weight is caused due to oxygen, heat and ultraviolet rays and particularly it is conspicuous by the ultraviolet rays with a wavelength of 300 nm or less. If the molecular weight decreases, the solution viscosity on dissolving the chlorinated rubber obtained into solvent often becomes too low resulting in difficult to use for paint, hence it is desirable to eliminate the components of 300 nm or less depending on the use of chlorinated rubber. For eliminating the components of shorter wavelength than 300 nm, various filters can be used, but simply pyrex glass may be used. Moreover, the high-pressure mercury lamp has relatively less components of wavelength of 300 nm or less as a light source of ultraviolet rays and has intensive spectral lines at 313 nm and 366 nm in the near ultraviolet region, thus it is desirable as a light source of the invention. Moreover, for shortening the reaction time and raising the ulilization efficiency of chlorine, the power of the light source of ultraviolet rays is desirable to be not less than 10 W per 1 $m^3$ of rubber latex when the concentration is 10%. Furthermore, the power of ultraviolet rays may be gradually increased during the second step of chlorination so that it reaches not less than 10 W after the chlorine content has exceeded 55%. Besides, even if the power of ultraviolet rays may be under 10 W per 1 $m^3$ of rubber latex, the chlorination is possible, though the reaction time becomes longer.

The reaction temperature in the second step of chlorination is preferable to be 40° to 100° C. If under 40° C., it takes longer time for the reaction, and, even if chlorinating over 100° C., not only there are no advantages, but also pressurized reaction equipment is needed and the procedure also becomes complicated. Moreover, it is preferable that, in the second step of chlorination, the temperature is gradually raised from 40° C. and the chlorination is performed at 60° C. or higher after a point having exceeded 55% chlorine content.

As a reaction equipment for the chlorination of rubber latex in the invention, a reaction tank provided with internal glass lining and equipped with stirrer and jacket can be used, and the first step and the second step of chlorination may be conducted successively. It is desirable to purge the air with inert gas prior to the chlorinating reaction for preventing the scission of molecules. Additives such as antifoamer and radical generator may be added during the chlorinating reaction without any hindrance. After the completion of reaction, the product forms a suspension of particles with several microns to scores of microns, so it can be separated by filtration and white powdery product is obtained by washing with water followed by drying. Moreover, by blowing oxygen or by controlling the temperature or the luminous energy of ultraviolet rays on the way of reaction, it is possible to adjust the molecular weight of product.

The chlorinated rubber produced by the inventive method in this way has a quality equal to or higher than that of product produced by the solution method and easily dissolves into organic solvents such as toluene, xylene, ethyl acetate and MEK permitting the use for point.

When chlorinating rubber latex by the inventive method, nonionic or cationic surfactant is added and then acid is added, hence the latex is stable even in the acidic state and, even if introducing chlorine gas to latex, the latex does not coagulate. In addition, light is blocked off and chlorination is performed at low temperature in the first step of chlorination, hence the coagulation of latex is not caused. For this reason, direct chlorination of latex is possible. In the second step of chlorination, chlorination is proceeded while irradiating ultraviolet rays, hence it is possible to make the chlorinated rubber with 60% or more chlorine content and with solvent solubility. The mechanism is not clearly known, but it seems to be due to the action of near ultraviolet components in ultraviolet rays. In addition to this, it is considered to be due to that, since the treatment before chlorination and the conditions in the first step of chlorination are good, the coagulation of latex is not caused leaving fine particles as they are, thus chlorine is liable to penetrate into inner portion of particles to chlorinate relatively homogeneously.

In following, the invention will be illustrated concretely based on the examples, but the invention is not confined to these.

EXAMPLE 1

To 3 kg of natural rubber latex (Soctex-CC, high ammonia type, 60% solids) were added 90 g of nonionic surfactant (Emunon 3199, made by Kao) and 30 liters of water, and, after stirred well, hydrochloric acid was added to be pH 1. This was charged into a reaction vessel with an inner volume of 50 liters, which was equipped with a stirrer and a pyrex glass tube accommodated high-pressure mercury lamp (rated power: 450 W), thermometer and exhaust port of waste gas and provided with internal glass lining. After the system was purged with nitrogen gas, light was blocked off and chlorine gas was blown at room temperature from an opening provided at the bottom of flask. After 3 hours, sampling was made and the determination of chlorine content showed to be 43% (% by weight, same hereinafter). Lighting a mercury lamp and raising the temperature to 80° C., the chlorine gas was blown further for 7 hours. The reaction mixture was filtered, washed with water and dried to obtain white powder. The chlorine content was 65% and the product dissolved easily into toluene.

EXAMPLE 2

Except that natural rubber latex was replaced by synthetic polyisoprene rubber latex (Maxprene IR-900, made by Sumitomo Seika), similar procedure to Example 1 was conducted to obtain chlorinated rubber with 66% chlorine content. When trying to dissolve into toluene, it dissolved easily.

EXAMPLE 3

To 3 kg of natural rubber latex (same as in Example 1) were added 18 g of surfactant (same as in Example 1) and 30 liters of water, then hydrochloric acid was added to bring pH to 1. This was stirred well and charged into the same equipment as in Example 1. The chlorination was performed while gradually adding a solution dissolved 36 g of surfactant (same as in Example 1) into 1 liter of water during initial 3 hours of chlorination. Thereafter, the same procedure as in Example 1 was conducted to complete the chlorination. The chlorine content of product was 68% and it dissolved easily into toluene.

EXAMPLE 4

The same procedure as in Example 1 was conducted, but a quarts tube was used for the tube to accommodate mercury lamp. This transmits ultraviolet rays also under 300 nm. The chlorine content of chlorinated rubber thus obtained was 67% and it dissolved easily into toluene. When determining the viscosity of 20% toluene solution, it was 10 cp in the case of Example 1 and 6 cp in the case of this example.

EXAMPLE 5

The same procedure as in Example 1 was conducted, but a lower output (rated power: 100 W) was used for mercury lamp. When putting forward the chlorination for 15 hours, a chlorinated rubber with 65% chlorine content soluble into toluene was obtained.

EXAMPLE 6

The same procedure as in Example 1 was conducted, but the temperature was raised from 40° C. to 90° C. at a rate of 7° C./ hour in the second step of chlorination. The chlorine content of chlorinated rubber obtained was 68% and it dissolved easily into toluene.

EXAMPLE 7

When chlorinating for 13 hours by the same procedure as in Example 1, a chlorinated rubber with 70% chlorine content soluble easily into toluene was obtained.

COMPARATIVE EXAMPLE 1

Into the same equipment as in Example 1 were charged 3 kg of natural rubber latex (same as in Example 1) and 30 liters of water, and chlorine gas was blown into this. After a while, the latex become a large lump making it difficult to continue the chlorination.

COMPARATIVE EXAMPLE 2

To the same equipment as in Example 1 were added 3 kg of natural rubber latex (same as in Example 1), 90 g of nonionic surfactant (Emunon 3199, made by Kao) and 30 liters of water, and chlorine gas was blown into this. After a while, the latex became a large lump similarly to Comparative example 1 making it difficult to continue the chlorination.

COMPARATIVE EXAMPLE 3

Except that the mercury lamp was lighted from the beginning, the chlorination was performed similarly to Example 1. One hour later, the latex began to coagulate and thereafter it became a lump.

COMPARATIVE EXAMPLE 4

Except that the temperature was raised to 60° C. from the beginning, the chlorination was conducted similarly to Example 1. The latex became a lump similarly to Comparative example 3.

COMPARATIVE EXAMPLE 5

Except that the fluorescent lamp was used in place of mercury lamp, the chlorination was performed similarly to Example 1. Despite of the chlorination for 30 hours, the chlorine content was 62% and the product swelled in toluene but did not dissolve.

REFERENTIAL EXAMPLE

Into a glass-lined reactor with an inner volume of 50 liters were charged 2 kg of natural rubber (RSS No. 1, Mooney viscosity 50) and 40 liters of carbon tetrachloride, which was dissolved at 75° C. The chlorination was performed at a reaction temperature of 75° C. by introducing chlorine gas for 15 hours while irradiating the light. The reaction mixture was steam-distilled and dried to obtain powder of chlorinated rubber. The chlorine content was 68%.

PERFORMANCE TEST OF CHLORINATED RUBBER

To 100 parts of each chlorinated rubber of Example 1, 2 or Comparative example 5 or chlorinated rubber produced by the solution method in Referential example were added 45 parts of chlorinated paraffin (A-40), 125 parts of titanium dioxide, 2.5 parts of stabilizer and 250 parts of xylene, and the mixture was kneaded to prepare a paint. This was painted onto a sand-blasted plate by spraying to test the performance. Results are shown in following table.

Besides, it was impossible to prepare the paint from the chlorinated rubber of Comparative example 5.

|  | Example | Example 2 | Comparative example 5 | Referential example |
|---|---|---|---|---|
| Adhesion | ⊚ | ⊚ | — | ⊚ |
| Saline water spray test | ⊚ | ⊚ | — | ○ |
| Humidity resistance | ⊚ | ⊚ | — | ○ |
| Alkali resistance | ⊚ | ⊚ | — | ○ |
| Accelerated weather resistance | ○~Δ | ○~Δ | — | ○~Δ |

TESTING METHOD

Adhesion: Cross-cut test, 7 days later
Saline water spray test: Spraying of 5% NaCl solution at 35° C., 30 days later
Humidity resistance: 50° C., 100% RH, 30 days later
Alkali resistance: Dipping into 3% NaOH solution, 30 days later
Accelerated weather resistance: Sunshine weather-O-Meter, 1000 hours later The results are expressed in five grades of ⊚, ○, Δ, X and XX.

Since the chlorinated rubber is made directly from latex in the inventive production method of chlorinated rubber, the reaction solvent such as carbon tetrachloride having been used hitherto is not used at all. Yet, the product having more excellent physical properties than the chlorinated rubber produced using solvent by the traditional method can be obtained. In addition, since the reaction solvent such as carbon tetrachloride, which is expensive, injurious to human body and in danger of destroying ozone layer, is not used, the inventive method is economic and safe sanitarily and does not destroy the global environment. Moreover, compared with the attempts to chlorinate latex, the reaction process is simple, the commercialization is easy and further the organic solvent-soluble chlorinated rubber is producible in accordance with the invention.

What is claimed is:

1. A method of producing organic solvent-soluble chlorinated rubber having a chlorine content of 60 to 75% by a method of chlorinating rubber latex with chlorine gas in an aqueous medium, comprising the steps of:
    (A) adding a nonionic or cationic surfactant to a rubber latex prior to chlorination and then adding acid to acidify the latex,
    (B) chlorinating the rubber latex to an at least 30% chlorine content at a temperature of not higher than 50° C. while blocking off the light in a first step of chlorination, and
    (C) carrying out the remaining chlorination while irradiating the product of (B) with ultraviolet rays in a second step of chlorination.

2. The method of producing chlorinated rubber according to claim 1, wherein the rubber latex is natural rubber latex or synthetic polyisoprene rubber latex.

3. The method of producing chlorinated rubber according to claim 1 or 2, wherein, in the first step of chlorination, the rubber latex is chlorinated at a temperature of not higher than 50° C. up to 30% or more chlorine content while blocking off the light and while continuously or intermittently adding nonionic or cationic surfactant.

4. The method of producing chlorinated rubber according to any one of claim 1 or 2, wherein the ultraviolet rays to irradiate in the second step of chlorination are those from a high-pressure mercury lamp wherein the components of shorter wavelength than 300 nm have been eliminated.

5. The method of producing chlorinated rubber according to any one of claim 1 or 2, wherein, in the second step of chlorination, the remaining chlorination is performed at a temperature of not lower than 40° C. and not higher than 100° C. while irradiating ultraviolet rays.

6. The method of producing chlorinated rubber according to claim 3, wherein the ultraviolet rays to irradiate in the second step of chlorination are those from a high-pressure mercury lamp wherein the components of shorter wavelength than 300 nm have been eliminated.

7. The method of producing chlorinated rubber according to claim 3, wherein, in the second step of chlorination, the remaining chlorination is performed at a temperature of not lower than 40° C. and not higher than 100° C. while irradiating ultraviolet rays.

8. The method of producing chlorinated rubber according to claim 4, wherein, in the second step of chlorination, the remaining chlorination is performed at a temperature of not lower than 40° C. and not higher than 100° C. while irradiating ultraviolet rays.

* * * * *